United States Patent
Klein et al.

(10) Patent No.: US 10,162,319 B2
(45) Date of Patent: Dec. 25, 2018

(54) SYSTEM AND METHOD FOR CONFIGURING A SCHEDULE

(71) Applicant: Trane International Inc., Piscataway, NJ (US)

(72) Inventors: Kit W. Klein, Tyler, TX (US); Gregory S. Brown, Flint, TX (US); Karl J. Mutchnik, Tyler, TX (US); Rucky Paul Kathiresan, Chennai (IN)

(73) Assignee: Trane International Inc., Davidson, NC (US)

( * ) Notice: Subject to any disclaimer, the term of this patent is extended or adjusted under 35 U.S.C. 154(b) by 735 days.

(21) Appl. No.: 14/513,953

(22) Filed: Oct. 14, 2014

(65) Prior Publication Data

US 2015/0168933 A1    Jun. 18, 2015

Related U.S. Application Data

(60) Provisional application No. 61/890,675, filed on Oct. 14, 2013.

(51) Int. Cl.
| | | |
|---|---|---|
| *G05B 11/01* | (2006.01) | |
| *G05B 15/02* | (2006.01) | |
| *G05D 23/19* | (2006.01) | |
| *G05B 19/042* | (2006.01) | |

(52) U.S. Cl.
CPC ......... *G05B 15/02* (2013.01); *G05B 19/0426* (2013.01); *G05D 23/1917* (2013.01); *G05B 2219/23258* (2013.01); *G05B 2219/25419* (2013.01)

(58) Field of Classification Search
CPC ............... G05B 15/02; G05B 19/0426; G05B 2219/25419; G05B 2219/23258; G05D 23/1917
See application file for complete search history.

(56) References Cited

U.S. PATENT DOCUMENTS 4,606,401 A * 8/1986 Levine ................. G05B 19/104
165/11.1
6,318,639 B1 * 11/2001 Toth ..................... F24F 11/0012
165/244
(Continued)

FOREIGN PATENT DOCUMENTS

CN         1539250 A       10/2004
CN       101783068 A        7/2010
(Continued)

OTHER PUBLICATIONS international Search Report and Written Opinion, ISAUS, PCT/US2014/60475. Trane International Inc., dated Jan. 13, 2015, 11 pgs.
(Continued)

*Primary Examiner* — Adam Lee
(74) *Attorney, Agent, or Firm* — Taft Stettinius & Hollister LLP (57) ABSTRACT

A control device includes a graphical user interface for an automated schedule. The automated schedule may include multiple schedule periods. Schedule parameters may be adjusted by selecting a portion of one of the schedule periods, for example, on a touchscreen display. The control device may be a thermostat to control temperature in a building.

20 Claims, 5 Drawing Sheets

(56) References Cited

U.S. PATENT DOCUMENTS

| | | | |
|---|---|---|---|
| 6,628,997 B1* | 9/2003 | Fox | G05D 23/1904 165/200 |
| 6,651,895 B1* | 11/2003 | Kadle | B60H 1/00971 236/49.3 |
| 8,091,796 B2 | 1/2012 | Amundson et al. | |
| 8,239,066 B2 | 8/2012 | Jennings et al. | |
| 8,527,096 B2 | 9/2013 | Pavlak et al. | |
| 8,613,792 B2 | 12/2013 | Ragland et al. | |
| 9,157,645 B1* | 10/2015 | Goss | F24F 7/00 |
| 2005/0194457 A1* | 9/2005 | Dolan | G05D 23/1904 236/51 |
| 2007/0244572 A1* | 10/2007 | Farr | G05B 15/02 700/12 |
| 2008/0048046 A1* | 2/2008 | Wagner | G05D 23/1904 236/91 R |
| 2009/0057426 A1* | 3/2009 | Sullivan | F24F 11/006 236/51 |
| 2009/0140056 A1* | 6/2009 | Leen | F24F 11/0086 236/49.3 |
| 2009/0192651 A1* | 7/2009 | Amundson | G05B 19/0426 700/278 |
| 2010/0070089 A1* | 3/2010 | Harrod | F24F 11/0086 700/277 |
| 2011/0022190 A1* | 1/2011 | Hegde | G06Q 10/06 700/16 |
| 2011/0046792 A1* | 2/2011 | Imes | H04L 67/42 700/278 |
| 2011/0132991 A1* | 6/2011 | Moody | G05D 23/1902 236/46 R |
| 2012/0048955 A1* | 3/2012 | Lin | F23N 5/203 236/46 R |
| 2012/0067560 A1* | 3/2012 | Bergman | F24F 11/006 165/238 |
| 2012/0116592 A1* | 5/2012 | Koushik | G05D 23/1904 700/276 |
| 2012/0158190 A1* | 6/2012 | Belady | F24F 5/0096 700/277 |
| 2012/0185101 A1* | 7/2012 | Leen | F24F 11/006 700/278 |
| 2012/0260206 A1* | 10/2012 | Cipollo | G06Q 10/109 715/771 |
| 2013/0006400 A1* | 1/2013 | Caceres | H04L 12/2803 700/90 |
| 2013/0013118 A1 | 1/2013 | Merkulov et al. | |
| 2013/0027412 A1 | 1/2013 | Roddy | |
| 2013/0098596 A1* | 4/2013 | Fisher | F24F 11/0034 165/237 |
| 2013/0154839 A1* | 6/2013 | Barton | F24F 12/001 340/584 |
| 2013/0178985 A1* | 7/2013 | Lombard | G05D 23/1904 700/276 |
| 2013/0178986 A1* | 7/2013 | Lombard | G05D 23/1904 700/276 |
| 2013/0226352 A1* | 8/2013 | Dean-Hendricks | F24F 11/0009 700/276 |
| 2013/0263034 A1* | 10/2013 | Bruck | F24F 11/0086 715/771 |
| 2013/0297078 A1* | 11/2013 | Kolavennu | G05D 23/1917 700/276 |
| 2014/0031990 A1* | 1/2014 | Filbeck | F24F 11/006 700/276 |
| 2014/0058567 A1* | 2/2014 | Matsuoka | G05D 23/1917 700/276 |
| 2014/0207291 A1 | 7/2014 | Golden et al. | |
| 2014/0309788 A1* | 10/2014 | Blum | G01S 19/51 700/276 |
| 2014/0319232 A1* | 10/2014 | Gourlay | F24F 11/0086 236/51 |

FOREIGN PATENT DOCUMENTS

| | | |
|---|---|---|
| CN | 101932884 A | 12/2010 |
| CN | 102354167 A | 2/2012 |
| JP | 2010166636 A | 7/2010 |

OTHER PUBLICATIONS

First Chinese Office Action, Chinese Patent Application No. 201480067862.4, dated Jun. 5, 2018, 36 pages including English translation.

* cited by examiner

SYSTEM AND METHOD FOR CONFIGURING A SCHEDULE

CROSS REFERENCE TO RELATED APPLICATIONS

The present application claims the benefit of U.S. Provisional Patent Application No. 61/890,675 filed on Oct. 14, 2013, which is hereby incorporated by reference in its entirety.

BACKGROUND

The present application generally relates to configuring a schedule, and more particularly, relates to configuring a schedule via a graphical user interface (GUI) of a control device. Some existing systems have various shortcomings relative to schedule configuration. Accordingly, there remains a need for further contributions in this area of technology.

SUMMARY

Unique systems and methods for configuring a schedule are disclosed. One exemplary embodiment includes a graphical user interface (GUI) being used for configuring one or more schedule periods on a computing device. Further embodiments, forms, objects, features, advantages, aspects, and benefits shall become apparent from the following description and drawings.

In one aspect of the present application a method, comprises: configuring an automated schedule with a graphical user interface (GUI); and allowing synchronization of a set of control operations to a control device in response to the automated schedule, wherein configuring includes selecting a series of available schedule options and defining a plurality of schedule periods each having a set of schedule parameters, wherein the set of schedule parameters includes at least one of a day, a start time, a next period start time, an upper threshold, and a lower threshold, wherein the GUI includes a selectable top portion for displaying and editing the upper threshold, a middle portion for displaying a duration between the start time and the next period start time, and a selectable bottom portion for displaying and editing the lower threshold.

Features of the aspect may include: controlling, with the control device, operation of one of a control lock, a light, a sensor, an appliance, a camera, a garage door opener, a supply water valve, a sprinkler water valve, a pool pump, pool equipment, a water heater, an economizer, and a wireless relay or contact based on the automated schedule; wherein the control device is a thermostat; wherein synchronization includes a heating operation and a cooling operation.

In another aspect of the present application an automated schedule configuration method including a graphical user interface (GUI), comprises: configuring a plurality of schedule periods using a schedule period interface having a substantially rectangular shape and a start time interface; selecting an edit mode for adjusting schedule parameters by selecting one of a portion of the schedule period interface and the start time interface, wherein the schedule parameters include a day, a start time, a next period start time, an upper threshold, and a lower threshold, wherein the schedule period interface includes a selectable top portion for displaying and editing the upper threshold, a middle portion for displaying a duration between the start time and the next period start time, and a selectable bottom portion for displaying and editing the lower threshold.

Features of the aspect may include: wherein the GUI further includes a period management interface including a top control for adding a period and a bottom control for deleting a selected schedule period; wherein the GUI further includes a variable control interface including a first control configured to allow a user to return to a home screen interface, a second control configured to allow the user to copy at least one of the schedule periods, a third control configured to allow the user to paste the previously copied at least one schedule period, and a fourth control configured to allow the user to return to a previous screen interface; wherein the GUI further includes a setting adjustment interface including a top control for increasing a setting of the edit mode, a middle portion for displaying a mode setting description, and a lower control for decreasing the setting of the edit mode; wherein the GUI further includes a top banner including a display indicating the mode setting; controlling operation of one of a control lock, a light, a sensor, an appliance, a camera, a garage door opener, a supply water valve, a sprinkler water valve, a pool pump, pool equipment, a water heater, an economizer, and a wireless relay or contact based on the schedule periods; wherein the start time interface includes a selectable start time display and a selectable start time edge; wherein the schedule period interface width is proportional to the duration of the period with respect to the amount of total time in a day; wherein the schedule period interface height is proportional to the difference between the upper threshold and the lower threshold, wherein the schedule period interface height is configured to increase when the difference increases and decrease when the difference decreases.

Yet another aspect of the present application includes a system, comprising: a computing device including a graphical user interface (GUI); a cloud application; and a control device; wherein the GUI displays a plurality of user defined schedule periods for configuring automated temperature settings on the computing device; wherein the computing device is in communication with the cloud application; and wherein the cloud application is in communication with the control device, wherein the automated temperature settings include a day, a start time, a next period start time, an upper threshold, and a lower threshold, wherein the GUI includes a selectable top portion for displaying and editing the upper threshold, a middle portion for displaying a duration between the start time and the next period start time, and a selectable bottom portion for displaying and editing the lower threshold.

Features of the aspect may include: wherein the computing device is external to the control device; wherein the computing device is internal to the control device; wherein the control device is a thermostat; wherein the GUI further includes a variable control interface including a first control configured to allow a user to return to a home screen interface, a second control configured to allow the user to copy at least one of the schedule periods, a third control configured to allow the user to paste the previously copied at least one schedule period, and a fourth control configured to allow the user to return to a previous screen interface; wherein the GUI further includes a setting adjustment interface including a top control for increasing a setting of an edit mode, a middle portion for displaying a mode setting description, and a lower control for decreasing the setting of the edit mode; wherein a height of the schedule periods is proportional to the difference between the upper threshold and the lower threshold, wherein the height of the schedule periods is configured to increase when the difference increases and decrease when the difference decreases.

BRIEF DESCRIPTION OF THE DRAWINGS

The description herein makes reference to the accompanying figures wherein like reference numerals refer to like parts throughout the several views, and wherein.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
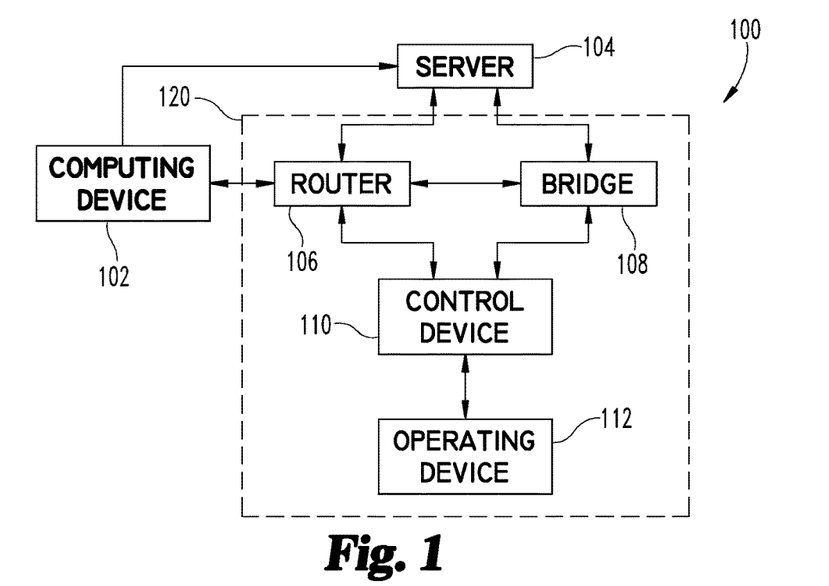
FIG. 1 is a schematic block diagram of an exemplary scheduling system.

FIG. 1 illustrates an exemplary system 100 that includes a computing device 102 configured to display a graphical user interface (GUI) that allows the user to setup and edit an automated schedule via the computing device 102. For example, the computing device 102 may be a mobile device, a reader device, equipment, a handheld computer, a diagnostic tool, a controller, a computer, a server, a processing system, a printer, a display, an alarm, an illuminated indicator such as a status indicator, a keyboard, a mouse, or a touch screen display.

System 100 further includes a server 104, a router 106, a bridge 108, a control device 110, and an operating device 112. System 100 may further include a building 120 such as a residential home or commercial office building that generally houses the router 106, bridge 108, control device 110, and/or operating device 112. For example, building 120 may include one or more control devices 110 that control one or more operating devices 112.

In one embodiment, the control device 100 is a thermostat and the operating device 112 is a heating, ventilating, and air conditioning (HVAC) system. It is contemplated that in other embodiments, the control device 110 may be another type of controller such as, for example, a home automation controller, and the operating device 112 may be a control lock, a light control module, a sensor, an appliance module, a camera, a garage door opener, a supply water valve, a sprinkler water valve, pool pumps and pool equipment (e.g., heaters, lights, accessory pumps, pool sweep pumps), water heaters such as whole home domestic water heaters that may be gas or electric, economizers that used for free cooling when outdoor temperature and/or relative humidity conditions meet defined requirements/limits (A/C accessory), any wireless relay or contact that energizes or de-energizes any home appliance, and/or any other type of device that may operate in or around the building 120.

As illustrated in FIG. 1, the server 104 is generally external to the building 120. In system 100, the computing device 102 is in communication with the router 106 and/or bridge 108 through the server 104 via the Internet, thereby allowing communication generally from any location with an Internet connection. The computing device 102 may be in communication with the router 106 and/or the control device 110 (e.g., via a WIFI connection) when the computing device 102 is in or near the building 120. The bridge 108 may communicate with the control device 110 and/or the operating device 112 via wireless connection such as a Z-wave connection. It is contemplated that wireless protocols other than WIFI and Z-wave may be used such as Bluetooth among others.

The server 104 may function as a cloud server having a cloud application installed that is configured to process configuration data and/or facilitate communication via the Internet between the computing device 102 and the router 106 and/or bridge 108. The cloud server application may reside and execute on one or more cloud servers.

The control device 110 is generally connected to the router 106 and/or bridge 108. The control device 110 is operable to send commands to the operating device 112 and the operating device 112 is operable to receive and/or interpret commands from the control device 110. It is contemplated that in some embodiments, the control device 110 is in communication with the computing device 102 via a wireless connection such as WIFI, Z-wave, Bluetooth, and/or any other appropriate wireless protocol. Communication between control device 110 and the computing device 102 may be a direct communication connection or an indirect communication connection through one or more devices in the wireless network. It is further contemplated that the computing device 102 may be part of or internal to the control device 110, such that the schedule configuration interface is directly displayed on the control device 110. As one example, a thermostat with a GUI may include both the computing device 102 and the control device 110. It is further contemplated that the computing device 102 is a virtual device that consists of a software program application that executes on an electronic device.

In certain embodiments, the bridge 108 communicates with the control device 110. It is contemplated that in some embodiments, some control devices 110 communicate with the router 108 or the computing device 102 without a bridge 108. The server 104 may also communicate with the bridge 108, via the Internet, to provide an interface for a user of the computing device 102 to use for setting up and/or configuring the automation schedule. The server 104 may send commands and/or configuration information to the control device 110 whether the control device 110 is connected directly to the Internet via router 106 or connected via the bridge 108. Further, the bridge 108 may form a mesh network with the control device 110 and/or the one or more operating device(s) 112. The bridge 108 may be connected to the Internet through the router 106, allowing the control device 110 to be connected to the Internet via the mesh network.

Figure 2:
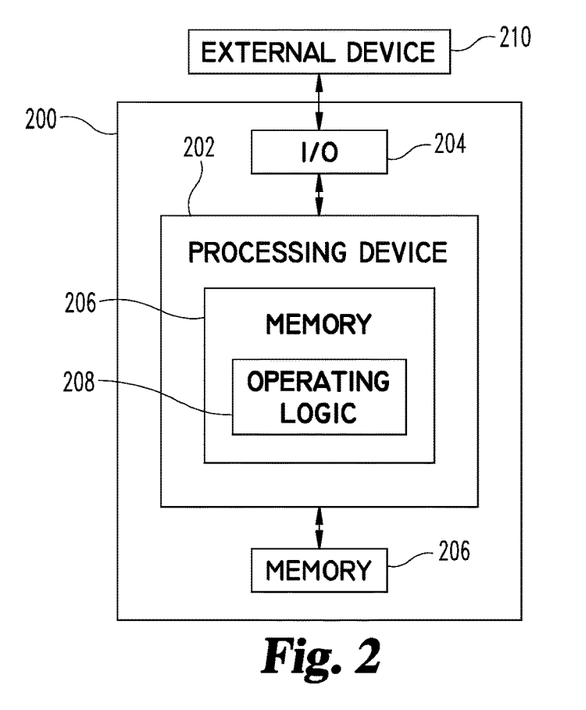
FIG. 2 is a schematic block diagram of an exemplary computing device.

FIG. 2 is a schematic block diagram of a computing device 200. The computing device 200 is one example of the computing device 102 shown in FIG. 1. Computing device 200 includes a processing device 202, an input/output device 204, memory 206, and operating logic 208. Furthermore, computing device 200 communicates with one or more external devices 210, for example, the server 104 and/or the control device 110 illustrated in FIG. 1.

The input/output device 204 allows the computing device 200 to communicate with the external device 210. For example, the input/output device 204 may be a transceiver, network adapter, network card, interface, or a port (e.g., a USB port, serial port, parallel port, an analog port, a digital port, VGA, DVI, HDMI, Fire Wire, CAT 5, or any other type of port or interface). The input/output device 204 may be include hardware, software, and/or firmware. It is contemplated that the input/output device 204 will include more than one of these adapters, cards, or ports.

The external device 210 may be any type of device that allows data to be inputted or outputted from the computing device 200. For example, the external device 210 may be a control device, a router, a bridge, an operating device, a mobile device, a reader device, equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

Processing device 202 can be a programmable type, a dedicated, hardwired state machine, or any combination of these. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 may include one or more components of any type suitable to process the signals received from input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 2, memory 206 may be included with processing device 202 and/or coupled to the processing device 202.

Figure 3:
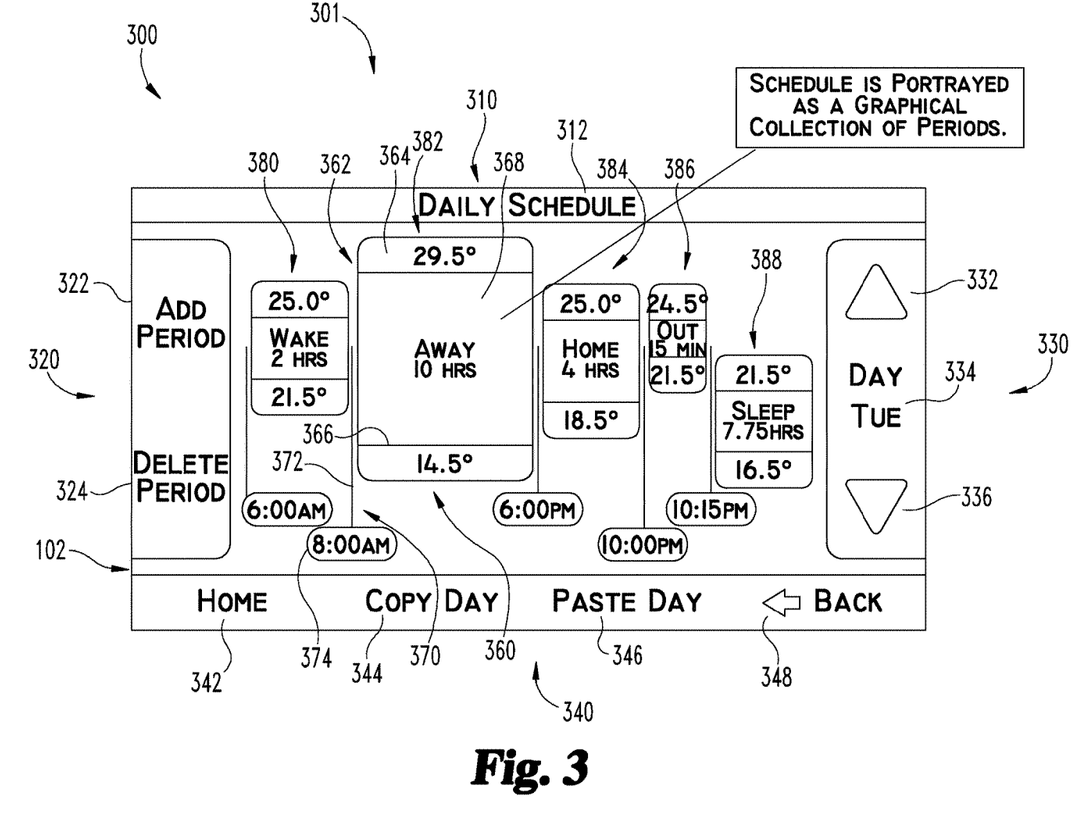
FIG. 3 is an exemplary illustration of a graphical user interface of a temperature schedule configuration interface displaying a schedule mode.
Figure 4:
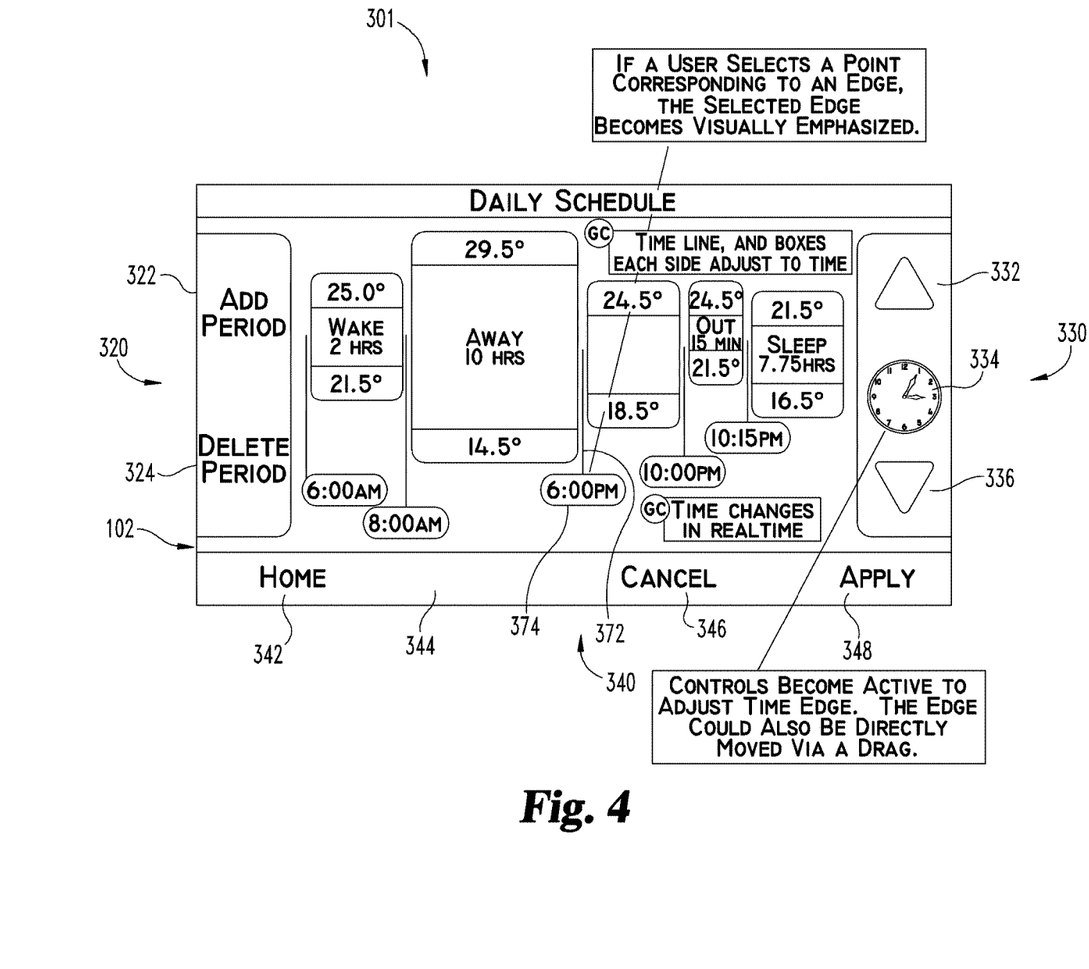
FIG. 4 is an exemplary illustration of a graphical user interface of a temperature schedule configuration interface displaying a schedule period upper threshold in an editable state.
Figure 5:
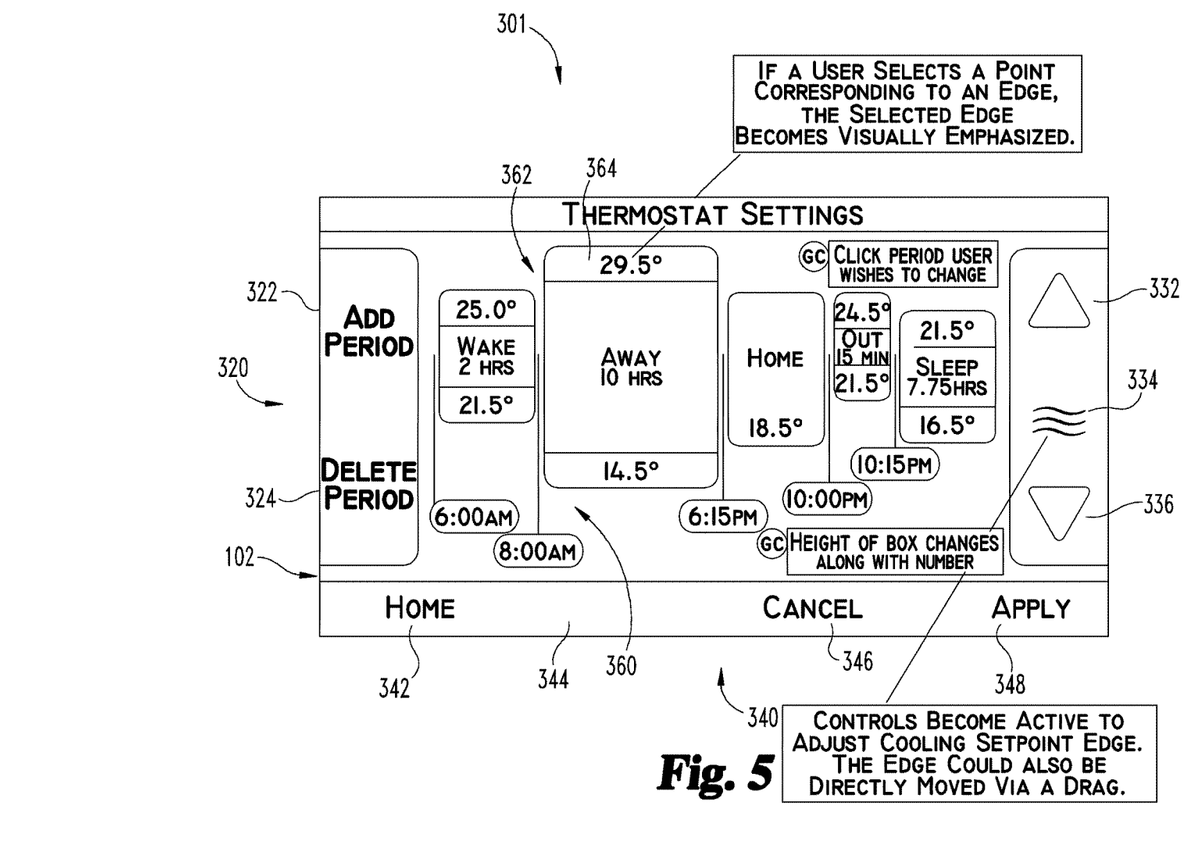
FIG. 5 is an exemplary illustration of a graphical user interface of an automated temperature schedule configuration interface showing a schedule period start time in an editable state.

An illustration of an exemplary GUI 301 for an automated temperature schedule configuration interface is illustrated in FIGS. 3-5. The automated temperature schedule is provided as an example of the scheduling systems contemplated herein and should not be construed as limiting. Scheduling may be applied to any suitable operating device to provide scheduling of control locks, scheduling of lights or sensors, scheduling of appliances, scheduling of cameras, scheduling of a garage door opener, scheduling of a supply water valve, scheduling of a sprinkler water valve, scheduling of pool pumps and pool equipment (e.g., heaters, lights, accessory pumps, pool sweep pumps), scheduling of water heaters such as whole home domestic water heaters that may be gas or electric, scheduling of economizers that used for free cooling when outdoor temperature and/or relative humidity conditions meet defined requirements/limits (A/C accessory), and/or scheduling of any wireless relay or contact that energizes or de-energizes any home appliance. FIG. 3 displays the GUI 301 in a daily schedule mode interface 300 displayed on the computing device 102. The daily schedule mode interface 300 includes a number of user-interfacing controls allowing a user to interact with the daily schedule mode interface 300, some non-limiting examples of which include a keyboard, a mouse, or a touch screen display. The daily schedule mode interface 300 includes a descriptor banner 310 docked to the top portion of the daily schedule mode interface 300 with an interface descriptor 312 describing the current interface mode contained therein.

A period management interface 320 is docked to the left-most side of the daily schedule mode interface 300. The period management interface 320 includes an add period control 322 that is a user interactive control which allows a user to add a new period to the currently selected day. The period management interface 320 includes a delete period control 324 that is a user interactive control which allows a user to delete a currently selected period from the currently selected day.

A setting adjustment interface 330 is docked to the right-most side of the daily schedule mode interface 300 that includes an increase setting control 332, a setting mode indicator 334, and a decrease setting control 336. When the daily schedule mode interface 300 is in a particular mode, the setting mode indicator 334 provides a visual reference as to that mode. FIG. 3 illustrates a day selection mode, such that the setting mode indicator 334 provides a visual reference as to the current day being viewed. The increase setting control 332 provides a user interactive control that allows a user to increase the particular mode setting, such as the day of the week in the mode displayed in the daily schedule mode interface 300. The decrease setting control 336 provides a user interactive control that allows a user to decrease the particular mode setting, such as the day of the week in the mode displayed in the daily schedule mode interface 300.

It is contemplated that the period management interface 320 and the setting adjustment interface 330 may be positioned anywhere on the daily schedule mode interface 300.

The daily schedule mode interface 300 further includes a variable control interface 340. The variable control interface 340 includes one or more user interactive variable controls. In the embodiment illustrated in FIG. 3, the daily schedule mode interface 300 includes a first variable control 342 that allows a user to return to a home screen interface, a second variable control 344 that allows a user to copy the periods displayed in the currently displayed day, a third variable control 346 that allows a user to paste the previously copied periods to the currently displayed day, and a fourth variable control 348 that allows a user to return to a previous screen interface.

One or more schedule period interface(s) 360 are displayed in the space defined between the period management interface 320, the descriptor banner 310, the setting adjustment interface 330, and the variable control interface 340. The schedule period interface 360 includes a threshold settings interface 362 and a time setting interface 370.

The threshold settings interface 362 is generally rectangular shaped with a high threshold control 364 with a high threshold setting display positioned at the top of the threshold settings interface 362, a low threshold control 366 with a low threshold setting display positioned at the bottom of the threshold settings interface 362, and a period setting descriptor 368 positioned between the high threshold control 364 and the low threshold control 366. The high threshold control 364 and low threshold control 366 are user interactive controls that allow the user to select the high threshold setting and/or the low threshold setting, respectively, for editing. In one embodiment, the high threshold control 364 may represent the cooling setpoint and the low threshold control 366 may represent the heating setpoint.

The period setting descriptor 368 provides a visual description of what the schedule period interface 360 represents and/or a duration of time the schedule period is scheduled to last for. The top-most edge of each schedule period interface 360 is horizontally aligned such that the schedule period interface 360 with the highest of the high threshold settings is closer to the descriptor banner 310, and the remaining schedule period interface(s) are horizontally aligned below based on the scaled difference between the lowest threshold setting and the highest threshold setting. When either of the high threshold control 364 or the low threshold control 366 are selected, the schedule mode switches from a display mode to a threshold editing mode and the setting mode indicator 334 is changed to reflect the current editing mode. In some embodiments, the high threshold control 364 and the low threshold control 366 may be adjusted by clicking and/or dragging the respective controls in a corresponding direction to increase or decrease the respective threshold setting.

In the embodiment illustrated in FIG. 3, five schedule period interfaces 380, 382, 384, 386, 388 are displayed in order of the earliest schedule period interface 380 to the latest schedule period interface 388. Schedule period interface 382, having the highest high threshold setting, is the closest schedule period interface 360 to the descriptor banner 310, providing a visual indicator that it is the highest of the high threshold settings for the currently displayed day. Similarly, schedule period interface 388, having the lowest high threshold setting, is the furthest schedule period interface 360 from the descriptor banner 310, providing a visual indicator that it is the lowest of the high threshold settings for the currently displayed day.

Each schedule period interface may also include other logic parameters that control the operation of the schedule period interface. For example, the daily schedule and each schedule period interface may require the overall system to not be in a vacation mode, thereby allowing the selection of a vacation mode to override this particular schedule.

It is contemplated that the threshold settings interface 362 may be a shape other than rectangular. It is also contemplated that the items in the GUI 301 may be located in a different arrangement and/or in a different orientation in other embodiments.

FIG. 4 provides an exemplary illustration of the GUI 301 in which the high threshold control 364 has been selected. With reference to FIG. 4, the threshold settings interface 362 and the high threshold control 364 are visually distinguishable as the current setting being editable and the setting mode indicator 334 is changed to a visual indicator to display that the high threshold setting is editable. In some embodiments, the increase setting control 332 is active to increase the high threshold setting, and the decrease setting control 336 is active to decrease the low threshold setting. It is contemplated that in other embodiments, the high threshold setting and the low threshold setting may be controlled by using either the high threshold control 364 and the low threshold control 366 or using the increase setting control 332 and the decrease setting control 336.

The time setting interface 370 in FIG. 3 includes a time edge control 372 and a time display control 374. The time edge control 372 is a user interactive control generally aligned parallel and adjacent to the left edge of threshold settings interface 362 which allows the user to adjust a schedule period start time. The time display control 374 is a user interactive control generally aligned perpendicular to and below the time edge control 372 which displays the schedule period start time and also allows the user to adjust the schedule period start time. In certain embodiments, the time setting interface may include a second time edge control (not shown) which would allow the user to adjust a schedule period end time.

Edge control need not be confined to selection of a particular time, but may also be selected as an event. An event may be a predefined occurrence or a logical combination of events or occurrences. For example, the event that triggers the edge control may be an unlocking of a door or a combination of unlocking the door plus detection of movement.

When either the time settings interface 370 or the time edge control 372 are selected, the schedule mode switches to a time editing mode and the setting mode indicator is changed to reflect the current editing mode. It is contemplated that in some embodiments, the time edge control 372 and/or the time display control 374 may be adjusted by clicking and dragging the respective controls in a corresponding direction to increase or decrease the schedule period start time. Furthermore, it is contemplated that the schedule period start time may be adjusted using the increase setting control 332 and the decrease setting control 336.

FIG. 5 illustrates an exemplary GUI 301 showing the time edge control 372 or the time display control 374 selected. With reference to FIG. 5, the time display control 374 is visually distinguishable as the current setting being editable, the setting mode indicator 334 is changed to a visual indicator to display that the schedule period start time is editable, the increase setting control 332 is active to increase the schedule period start time, and the decrease setting control 336 is active to decrease the schedule period start time.

FIGS. 4-5 further illustrate being in editable mode by changing the functionality of two of the variable control interface 340 controls 346 and 348, to apply the edited setting changes or cancel the edited setting changes. It is further contemplated that upon entering editable mode, the period management interface 320 is either enabled, as shown in FIG. 4, or disabled, as shown in FIG. 5.

The schedule period interface 360 shape denotes a threshold difference and time duration. The schedule period interface 360 width is proportional to the duration of the period with respect to the amount of total time in a day and the schedule period interface 360 height is proportional to the difference between the high threshold setting and the low threshold setting. The schedule period interface 360 shape is also scaled with respect to the number of schedule periods in the currently displayed day.

The color of each schedule period interface 360 may be indicative of whether the parameters selected are economical operating parameters.

It is contemplated that the various interfaces and/or components of the GUI may be of a shape other than rectangular such as circular. Furthermore, it is contemplated that another condition other than temperature may be controlled such as humidity.

Figure 6:
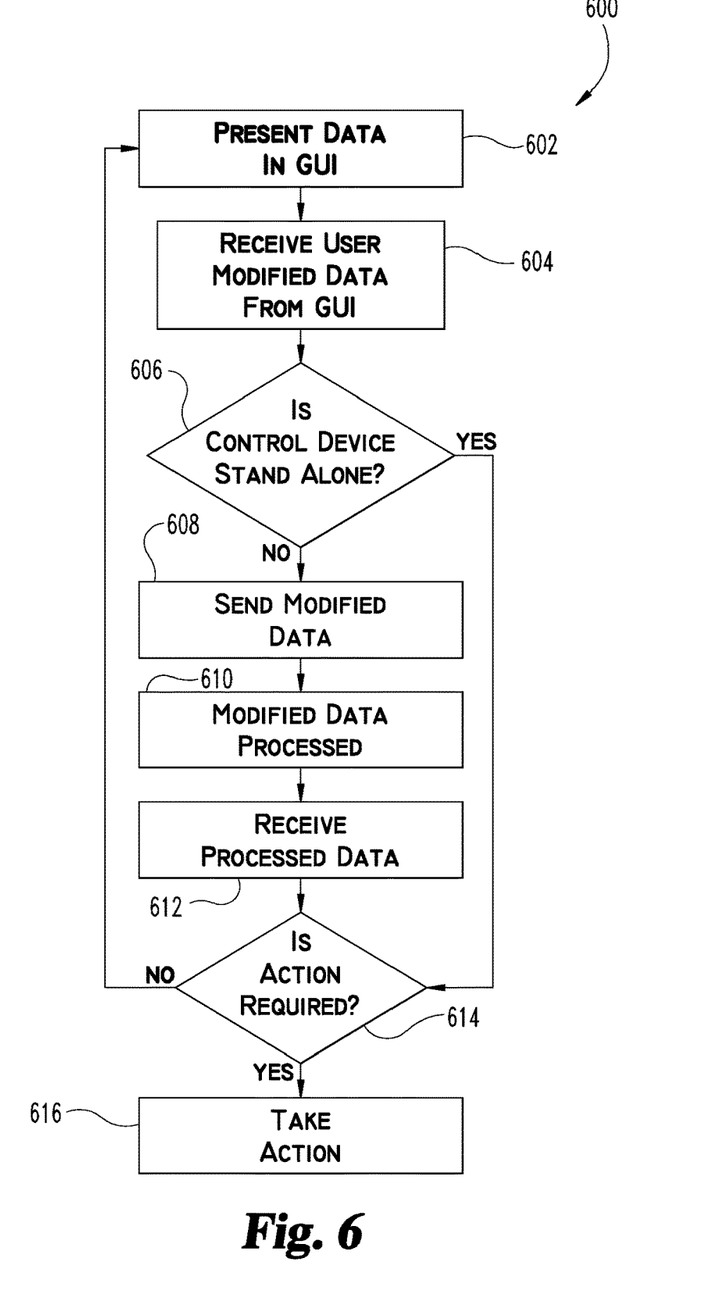
FIG. 6 is a schematic flow diagram of an exemplary process for configuring a schedule.

FIG. 6 illustrates a schematic flow diagram of an exemplary process 600 for configuring an automated schedule. Operations illustrated for all of the processes in the present application are understood to be examples only, and operations may be combined or divided, and added or removed, as well as re-ordered in whole or in part, unless explicitly stated to the contrary.

Process 600 begins at operation 602 in which the automated schedule data is presented to a user via the GUI 301 on the computing device 102 whereupon the user can make modifications to the automated schedule data. Operation 602 may begin when the user powers on the computing device 102, or launches the GUI 301 on the computing device 102.

Process 600 continues from operation 602 to operation 604, where the modified data is received by the computing device 102 from the GUI 301. Operation 604 typically occurs when the user has modified the data and/or applied the changes via the GUI 301 as shown in FIGS. 3-5.

Process 600 then proceeds to conditional 606 where it is determined whether the control device 110 is a standalone device. In certain embodiments, the computing device 102 can be part of or self-contained in the control device 110 (i.e. functioning as a standalone device), such that any network or server communication is unnecessary, as all the configuration between the GUI 301 on the computing device 102 is processed and stored at the control device 110. If conditional 606 is positive (e.g., the control device 110 is a standalone device), process 600 continues to conditional 614 where it is determined whether an action is required based on the most recently received data; otherwise, process 600 continues to operation 608 where the modified data is sent to a server 104, to the router 106, or to the control device 110.

From operation 608, process 600 proceeds at operation 610, wherein the modified data is processed by the server 104, the router 106, or the control device 110. In certain embodiments, the server 104 is a cloud server configured to communicate with the computing device 102. The cloud server generally has a cloud application configured to receive and interpret data from the computing device 102, process the data, and send the processed data to the control device 110 as shown in FIG. 1 via the router 106 and/or bridge 108. Process 600 then proceeds to operation 612 where the processed data is received by the control device 110 if the control device 110 did not receive the data directly from the computing device 102.

Process 600 proceeds to conditional 614, where it is determined whether an action is required based on the most recently received data. If conditional 614 is negative, no action is taken and the most recently received data continues to be presented in the GUI 301. If conditional 614 is positive, a corresponding action will be taken 616 pursuant to the most recently received data. For example, where the control device 110 is a thermostat, if a user modified a threshold temperature setting in the present time period such that the modified threshold temperature required an action be taken in the form of turning off or on the HVAC system 112 (e.g., an air conditioner or furnace), the control device 102 would take action by sending the appropriate command.

The various aspects of the process 600 in the present application may be implemented in operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the computing device 102, server 104, router 106, bridge 108, and control device 110 performs the described operations when executing the computer program.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
 configuring an automated schedule with a graphical user interface (GUI); and
 synchronizing a set of control operations of a control device according to the configured automated schedule, wherein the configuring includes
  selecting a series of available schedule options,
  defining a plurality of schedule periods each having a set of schedule parameters,
  configuring the set of schedule parameters for the plurality of schedule periods, and
  defining the start time for one or more of the plurality of schedule periods to be a triggered action based upon an event distinct from a selection of a particular time,
 wherein the set of schedule parameters includes a day, a start time, an upper threshold, and a lower threshold, and
 wherein for each of the plurality of schedule periods the GUI includes a corresponding schedule period interface including a selectable top portion for displaying and editing the upper threshold, a middle portion for displaying a time duration expressed in units of time representing the difference between the start time and a next period start time, and a selectable bottom portion for displaying and editing the lower threshold.

2. The method of claim 1, further comprising: controlling, with the control device, operation of one of a control lock, a light, a sensor, an appliance, a camera, a garage door opener, a supply water valve, a sprinkler water valve, a pool pump, pool equipment, a water heater, an economizer, and a wireless relay or contact based on the automated schedule.

3. The method of claim 1, wherein the control device is a thermostat.

4. The method of claim 3, wherein synchronization includes a heating operation and a cooling operation.

5. An automated schedule configuration method using a graphical user interface (GUI), comprising:
- configuring each of a plurality of schedule periods using a corresponding schedule period interface having a rectangular shape and a corresponding start time interface of the GUI; and
- selecting an edit mode for adjusting schedule parameters for each of the plurality of schedule periods by selecting one of a portion of the corresponding schedule period interface and the corresponding start time interface,
- wherein the schedule parameters include a day, a start time, an upper threshold, and a lower threshold,
- wherein each schedule period interface includes a selectable top portion for displaying and editing the upper threshold, a middle portion for displaying a time duration expressed in units of time representing the difference between the start time and a next period start time, and a selectable bottom portion for displaying and editing the lower threshold,
- wherein any of the selectable top portion and selectable bottom portion can be adjusted by a dragging action, and
- wherein a set of control operations of a control device are synchronized according to the configured plurality of schedule periods.

6. The method of claim 5, wherein the GUI further includes a period management interface including a top control for adding a schedule period and a bottom control for deleting a selected schedule period.

7. The method of claim 5, wherein the GUI further includes a variable control interface including a first control configured to allow a user to return to a home screen interface, a second control configured to allow the user to copy at least one of the schedule periods, a third control configured to allow the user to paste the previously copied at least one schedule period, and a fourth control configured to allow the user to return to a previous screen interface.

8. The method of claim 5, wherein the GUI further includes a setting adjustment interface including a top control for increasing a setting of the edit mode, a middle portion for displaying a mode setting description, and a lower control for decreasing the setting of the edit mode.

9. The method of claim 5, wherein the GUI further includes a top banner including a display indicating the mode setting.

10. The method of claim 5, further comprising:
- controlling operation of one of a control lock, a light, a sensor, an appliance, a camera, a garage door opener, a supply water valve, a sprinkler water valve, a pool pump, pool equipment, a water heater, an economizer, and a wireless relay or contact based on the schedule periods.

11. The method of claim 5, wherein each start time interface includes a selectable start time display and a selectable start time edge.

12. The method of claim 5, wherein for each of the schedule periods the width of the corresponding schedule period interface is proportional to the time duration of the schedule period with respect to the amount of total time in a day.

13. The method of claim 5, wherein for each of the schedule periods the height of the corresponding schedule period interface is proportional to the difference between the upper threshold and the lower threshold, wherein the height of the corresponding schedule period interface is configured to increase when the difference increases and decrease when the difference decreases.

14. A system, comprising:
- a computing device including a graphical user interface (GUI);
- a cloud application; and
- a control device;
- wherein for a plurality of user-defined schedule periods the GUI displays a plurality of corresponding user-defined schedule period interfaces for configuring automated temperature settings on the computing device;
- wherein the computing device is in communication with the cloud application;
- wherein the cloud application is in communication with the control device;
- wherein the automated temperature settings for each of the user-defined schedule periods include a day, a start time, an upper threshold, and a lower threshold;
- wherein the start time of each user-defined schedule period is capable of being a triggered action based upon an event distinct from a selection of a particular time;
- wherein for each of the plurality of user-defined schedule period interfaces the GUI includes a selectable top portion for displaying and editing the upper threshold, a middle portion for displaying a time duration expressed in units of time representing the difference between the start time and a next period start time, and a selectable bottom portion for displaying and editing the lower threshold;
- wherein the automated temperature settings are configured using the GUI; and
- wherein a set of control operations of the control device are synchronized according to the configured automated temperature settings.

15. The system of claim 14, wherein the computing device is external to the control device.

16. The system of claim 14, wherein the computing device is internal to the control device.

17. The system of claim 14, wherein the control device is a thermostat.

18. The system of claim 14, wherein the GUI further includes a variable control interface including a first control configured to allow a user to return to a home screen interface, a second control configured to allow the user to copy at least one of the schedule periods, a third control configured to allow the user to paste the previously copied at least one schedule period, and a fourth control configured to allow the user to return to a previous screen interface.

19. The system of claim 14, wherein the GUI further includes a setting adjustment interface including a top control for increasing a setting of an edit mode, a middle portion for displaying a mode setting description, and a lower control for decreasing the setting of the edit mode.

20. The system of claim 14, wherein a height of each schedule period interface is proportional to the difference between the respective upper threshold and the respective lower threshold, wherein the height of each schedule period interface is configured to increase when the difference increases and decrease when the difference decreases.

* * * * *